(12) United States Patent
Lopez et al.

(10) Patent No.: US 9,306,691 B2
(45) Date of Patent: Apr. 5, 2016

(54) METHODS AND DEVICES FOR TRANSMISSION OF SIGNALS IN A TELECOMMUNICATION SYSTEM

(71) Applicant: Telefonaktiebolaget L M Ericsson (publ), Stockholm (SE)

(72) Inventors: Miguel Lopez, Solna (SE); Dennis Hui, Sunnyvale, CA (US)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 444 days.

(21) Appl. No.: 13/822,408

(22) PCT Filed: Feb. 18, 2013

(86) PCT No.: PCT/SE2013/050136
§ 371 (c)(1),
(2) Date: Mar. 12, 2013

(87) PCT Pub. No.: WO2013/151476
PCT Pub. Date: Oct. 10, 2013

(65) Prior Publication Data
US 2014/0161030 A1 Jun. 12, 2014

Related U.S. Application Data

(60) Provisional application No. 61/618,918, filed on Apr. 2, 2012.

(51) Int. Cl.
*H04J 13/00* (2011.01)
*H04J 3/02* (2006.01)
(Continued)

(52) U.S. Cl.
CPC . *H04J 3/02* (2013.01); *H04L 23/02* (2013.01); *H04L 25/0226* (2013.01); *H04L 27/2643* (2013.01); *H04L 27/2613* (2013.01)

(58) Field of Classification Search
CPC ......... H04J 3/02; H04J 23/02; H04J 25/0226; H04J 27/2613; H04J 27/2643
USPC .......... 375/260, 295, 308, 371; 370/203, 210, 370/328; 307/207, 210, 335, 342; 455/110
See application file for complete search history.

(56) References Cited

U.S. PATENT DOCUMENTS

2002/0044524 A1* 4/2002 Laroia et al. .................. 370/203
2007/0004465 A1 1/2007 Papasakellariou et al.
(Continued)

FOREIGN PATENT DOCUMENTS

WO 200903689 A2 3/2009
WO 2010132398 A1 11/2010
(Continued)

OTHER PUBLICATIONS

3RD Generation Partnership Project. "Fast Feedback Channel (v1)." 3GPP TSG GERAN#44 WG1, GP-091988, Oct. 16-20, 2009, pp. 1-11, Agenda Item 7.1.5.3.6, Sophia Antipolis, France.
(Continued)

*Primary Examiner* — Alpus H Hsu
*Assistant Examiner* — Camquyen Thai
(74) *Attorney, Agent, or Firm* — Patents on Demand, P.A.; Brian K. Buccheit; Scott M. Garrett

(57) ABSTRACT

Methods and devices for generating training symbols to be transmitted in a radio network are provided for a radio system where multiple users are sharing the same transmission slot. The method involves forming a sequence of training symbols by repeating an initial block of training symbols and for each user rotating the repeated block by a user specific rotation angle. A rotated block is periodically extended in both ends.

14 Claims, 7 Drawing Sheets

(51) Int. Cl.
*H04L 23/02* (2006.01)
*H04L 25/02* (2006.01)
*H04L 27/26* (2006.01)

(56) References Cited

U.S. PATENT DOCUMENTS

| | | | |
|---|---|---|---|
| 2008/0080632 A1* | 4/2008 | Kim et al. | 375/267 |
| 2009/0185602 A1 | 7/2009 | Atarashi et al. | |
| 2009/0245399 A1* | 10/2009 | Lee et al. | 375/260 |
| 2010/0086078 A1* | 4/2010 | Dogan et al. | 375/295 |
| 2011/0019764 A1* | 1/2011 | Chung et al. | 375/295 |
| 2011/0170482 A1* | 7/2011 | Dhanda | 370/328 |

| | | |
|---|---|---|
| 2013/0272273 A1 | 10/2013 | Lopez et al. |

FOREIGN PATENT DOCUMENTS

| | | |
|---|---|---|
| WO | 2011145060 A1 | 11/2011 |
| WO | 2012047140 A1 | 4/2012 |

OTHER PUBLICATIONS

Yang, H. et al., "Interleaved Frequency Division Multiple Access for Upstream Transmission of Next-Generation PON", ACOFT Presentation, IQEC/CLEO Pacific Rim 2011, Sydney, Australia, Aug. 28-Sep. 1, 2011, pp. 471-473.

* cited by examiner

METHODS AND DEVICES FOR TRANSMISSION OF SIGNALS IN A TELECOMMUNICATION SYSTEM

FIELD OF THE INVENTION

The present invention relates to methods and devices for transmission of signals in a telecommunication system.

BACKGROUND

The number of users using existing mature mobile telecommunications systems such as GSM continues to grow. In order to continue improving the spectral efficiency of GSM/EDGE Global (System for Mobile Communication (GSM) Enhanced Data for GSM Evolution), there is a need to find effective ways of multiplexing multiple users' signals into a single time slot over a 200 kHz channel while avoiding or minimizing mutual interference among users.

In accordance with a proposal in 3GPP/GERAN (third generation partnership project/GSM EDGE Radio Access Network) a fast feedback channel for Voice over IP is proposed, see GERAN#44 GP-091988 "Fast Feedback Channel" (v1). The idea is to allow the Voice over internet protocol (IP) users to signal the network when there are packets available for transmission. This channel must allow fast feedback and must consume as little bandwidth as possible. To this end, up to four users are multiplexed into one timeslot by means of time division multiplexing.

In machine-type communications there may be a need for feeding back small amount of information in the uplink for thousands of machines. Therefore, it may be desirable to multiplex multiple logical feedback channels for different machines into a single GSM time slot.

In Voice services over Adaptive Multi-user channels on One Slot (VAMOS), a standardized 3GPP/GSM feature, up to two full rate users are multiplexed in a single time slot. However, in the uplink, the receiver requires complex multi-user detection since the two user signals are ordinary Gaussian minimum shift keying (GMSK) co-channel interferers.

Accurate channel estimation and synchronization are important steps in coherent wireless technologies such as GSM/EDGE or Long term evolution (LTE). The existing channel estimation and synchronization methods in GSM/EDGE, in the case of multi-user transmission (such as VAMOS), rely on orthogonal training sequences. However, the time modulated training sequences that are employed in these methods are typically not perfectly orthogonal, which can result in significant performance losses. Moreover, in practice it is very difficult to increase the number of users sharing the same radio resource without requiring also an increase in the number of antennas at the receiver. As a result, for many cases with the current GSM/EDGE technology, it is not practical to allow more than two users on the same radio resource when the receiver only has one antenna. In addition, channel estimation and synchronization is made even more difficult by the presence of relative timing differences among the users.

It would be desirable to multiplex more than two users (say 4 or 8 users) while keeping the number of receive antennas limited to the usual number of antennas available in most commonly deployed base stations, namely one or two antennas. This is not feasible with the current training sequence design.

Hence there exists a need for an improved transmission method for mobile telecommunications systems and in particular for systems as described above.

SUMMARY

It is an object of the present invention to provide improved methods and devices to address at least some of the problems as outlined above.

This object and others are obtained by the methods and devices as set out in the appended claims.

Thus, a training sequence design that is particularly well suited for multi-user/multi-layer multiplexing so that multiple users/streams can be detected and demodulated with only one receive antenna branch is presented. A user is in the context of the description a layer or a data stream.

In accordance with embodiments described herein transmitter and receiver methods and algorithms that allow simple and accurate multi-user detection of signals linearly modulated in the time domain are provided. In accordance with some embodiments, a sequence of training symbols is formed by repeating an initial block of training symbols. Different users rotate the repeated block by a user specific rotation angle. A rotated block is periodically extended on both ends. In accordance with some embodiments the rotation angles are selected to provide orthogonality between the different training sequences. When the radio channel is stationary over one burst, then perfect separation of the users can be achieved with only one receive antenna branch, even in the presence of timing offsets among the users.

In accordance with some embodiments the generation of truly orthogonal sub-channels for multiple users/layers, using signals linearly modulated in the time domain is enabled. The methods and apparatuses described herein may be used to transport signaling information or user code bits through wireless communications channels.

In accordance with one embodiment a method of generating training sequence symbols comprises the following steps. First, a block of training symbols with symbols from a complex constellation of fixed length is chosen. The complex constellation can be BPSK, QPSK, 8PSK, QAM or any other complex constellation. This initial block formed can be the same for all users, or it can be user specific. Then, the block is repeated. In particular the block is repeated as many times as there are users. Then there are as many copies as there are users. For example if 4 users will share the same time slot then the initial block is repeated 4 times. If the initial block consisted of 7 symbols then after repetition the block has 28=7*4 symbols. A user specific rotation is then applied. That is, each user will apply a rotation specific to that user only. At this point each user will have generated a different sequence of symbols even if the initial block was the same for all users, due to the rotation. Then, the rotated block is periodically extended on both sides. This can be performed by adding a cyclic prefix and a cyclic post-fix. The process of generating the training sequence symbols is now complete.

In accordance with one embodiment a method of receiving signals is provided. The method is particularly well suited to receive signals generated using a method for generating training symbol sequences as described herein. In accordance with such an exemplary embodiment first, a Discrete Fourier Transform (DFT) is applied to a block of received samples that correspond to the training symbols of the received signal, where the received signal has information from more than one user. This creates a frequency domain signal. Then selected entries of the frequency domain signal are zeroed. (To zero an entry means to multiply it by zero.) The entries that are zeroed are in accordance with some embodiments user specific entries of the frequency domain signal. Then, the zeroed frequency domain signal is transferred back to the time domain by means of an IDFT (inverse DFT). This time domain signal has the same length as the originally received signal, but now contains only energy from one of the plurality of users. The specific user is selected by the user specific zeroing. All other users have been cancelled.

The single user signal modulated in the time domain is then processed. This single user signal consists of a known training sequence modulated in the time domain and filtered through a radio channel. There are a plethora of algorithms available to compute a channel estimate for these types of signals, such as Least Squares, correlator, or Minimum Mean Square Error channel estimators. For example any EDGE receiver implements such channel estimation algorithms and these algorithms may be re-used in this case. A channel estimate for each single user signal can then be provided using any suitable method. The resulting channel estimates can then be fed to a demodulator. The demodulator can then demodulate the received signal.

In accordance with one embodiment a method of providing blind detection of a received signal is provided. In such a method it is first determined if the training sequences of a received signal are periodic. Depending on the decision made, the signal is fed to a MIMO/MU-MIMO demodulator. This is the case if the training sequences of the received signal are periodic. In case the training sequences of the received signal are not periodic the signal is fed to a single user demodulation.

The invention also extends to receivers and transmitters arranged to perform the methods as described herein. The receivers and transmitters can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Other objects and advantages of the invention will become apparent from the following detailed description of the invention.

BRIEF DESCRIPTION OF THE DRAWINGS

For a better understanding, reference is made to the following drawings and preferred embodiments of the invention.

DETAILED DESCRIPTION

Two Users

First embodiments with two users are described. The principles for a two-user case can be generalized to any number of users, as will be explained below.

Training Sequence Generation

Let $N_t$ denote the number of training symbols, to be placed as a midamble in the burst. The training sequences for both users can in accordance with one exemplary embodiment be constructed as follows.

1. Select $N_s$ training symbols $t(1), \ldots, t(N_s)$, with $2N_s < N_t$.
2. Form a block repeated sequence $t_{rep} = [t(1) \ldots t(N_s)] \otimes [1\ 1]$. Here $\otimes$ denotes the Kronecker product.
3. For each user u=1, 2 define rotation angles $$\omega_u = \frac{j2\pi \cdot (u-1)}{2N_s}.$$

Form the rotated repeated sequences $t_{rep}^u(n) = t_{rep}(n) \cdot \exp(j(n-1)\omega_u)$, $1 \le n \le 2 \cdot N_s$.

4. For each user u=0, 1 extend the rotated repeated sequences periodically, by adding a cyclic prefix and a cyclic postfix. Choose two integers $L_{pre}$ and $L_{post}$ such that $L_{pre} + L_{post} + 2N_s = N_t$. Here $L_{pre}$ is the length of a cyclic prefix and $L_{post}$ is the length of a cyclic postfix. If L denotes the discrete channel length then $L_{pre} \ge L-1$. $L_{post}$ should be chosen to be at least as large as the expected time offset between the two signals. The periodically extended sequences are $$v_u = \left[ \underbrace{t_{rep}^u(2N_s - L_{pre} + 1) \ldots t_{rep}^u(2N_s)}_{prefix}\ t_{rep}^u(1)\ \ldots\ t_{rep}^u(2N_s)\ \underbrace{t_{rep}^u(1) \ldots t_{rep}^u(L_{post})}_{postfix} \right]$$

u=1, 2.

Also, in accordance with some embodiments the symbols denoted [1 1] above in step 2 can be chosen such that the non-zero entries of the Discrete Fourier Transformation (DFT) of the vector $t_{rep}$ have similar amplitude. This is to ensure that the spectral properties of the training sequence are good enough to allow accurate channel estimation. In other words, it can be advantageous to make the block repeated training symbols to be as white as possible since it is known that white training sequences minimize the Cramer-Rao bound of the channel estimation error. This can be done, for example, by choosing the sequence of training symbols $t(1), \ldots, t(N_s)$ to be white (i.e. with the ideal Kronecker-delta function as the autocorrelation function).

Figure 3:
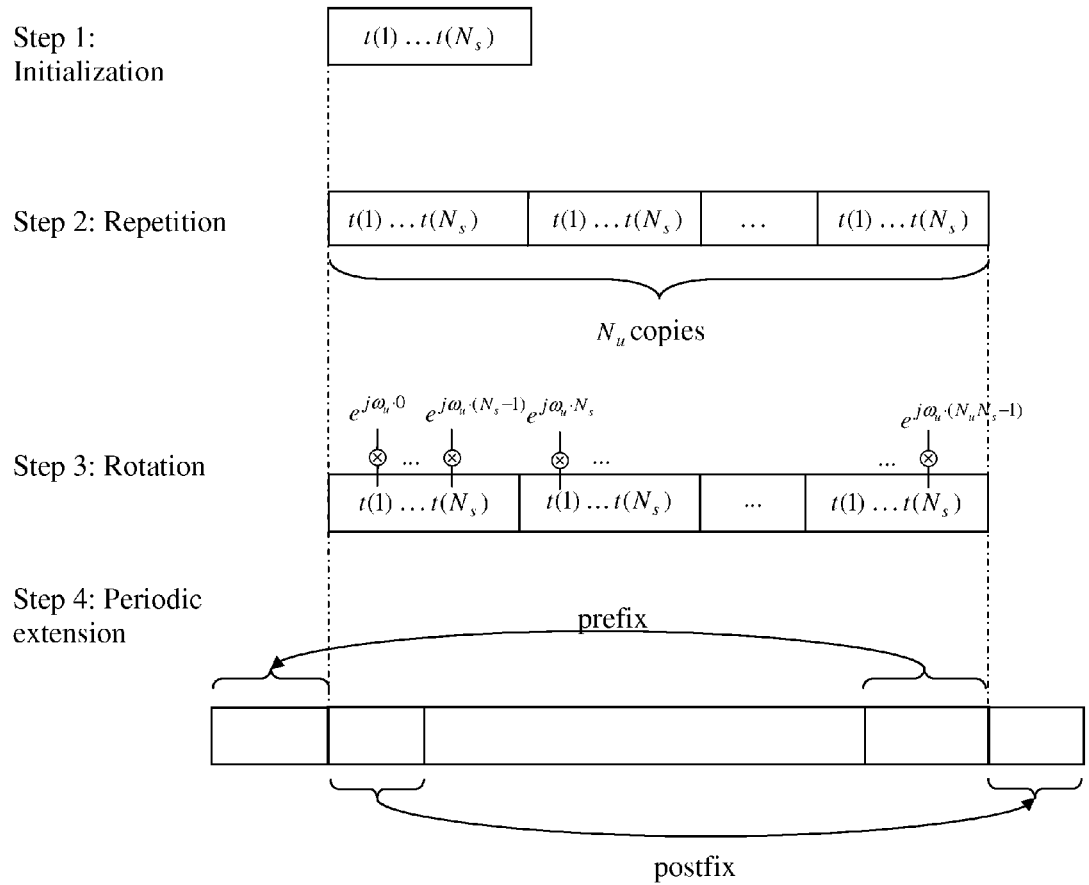
FIG. 3 is a view of a process for generating training sequences.

In FIG. 3, a process in accordance with the above is illustrated. First, in step 1 a block of training symbols of fixed length is chosen. These can be Binary Phase Shift Keying (BPSK), Quadrature Phase Shift Keying (QPSK), 8-Phase Shift Keying (8PSK), Quadrature Amplitude Modulation (QAM) or any other symbols from a complex constellation. This initial block may be the same for all users, or it may be user specific. Then in a step 2, the block is repeated. There are as many copies as there are users. For example if 4 users will share the same time slot then the initial block is repeated 4 times. If the initial block consisted of 7 symbols then after repetition the block has 28=7*4 symbols. A user specific rotation is then applied in a step 3. That is, each user will apply a rotation specific to that user only. At this point each user will have generated a different sequence of symbols even if the initial block was the same for all users, due to the rotation. Then, in step 4, the rotated block is periodically extended on both sides. This can be performed by adding a cyclic prefix and a cyclic post-fix. The process of generating the training sequence symbols is now complete.

Properties of the Training Sequences

Figure 1:
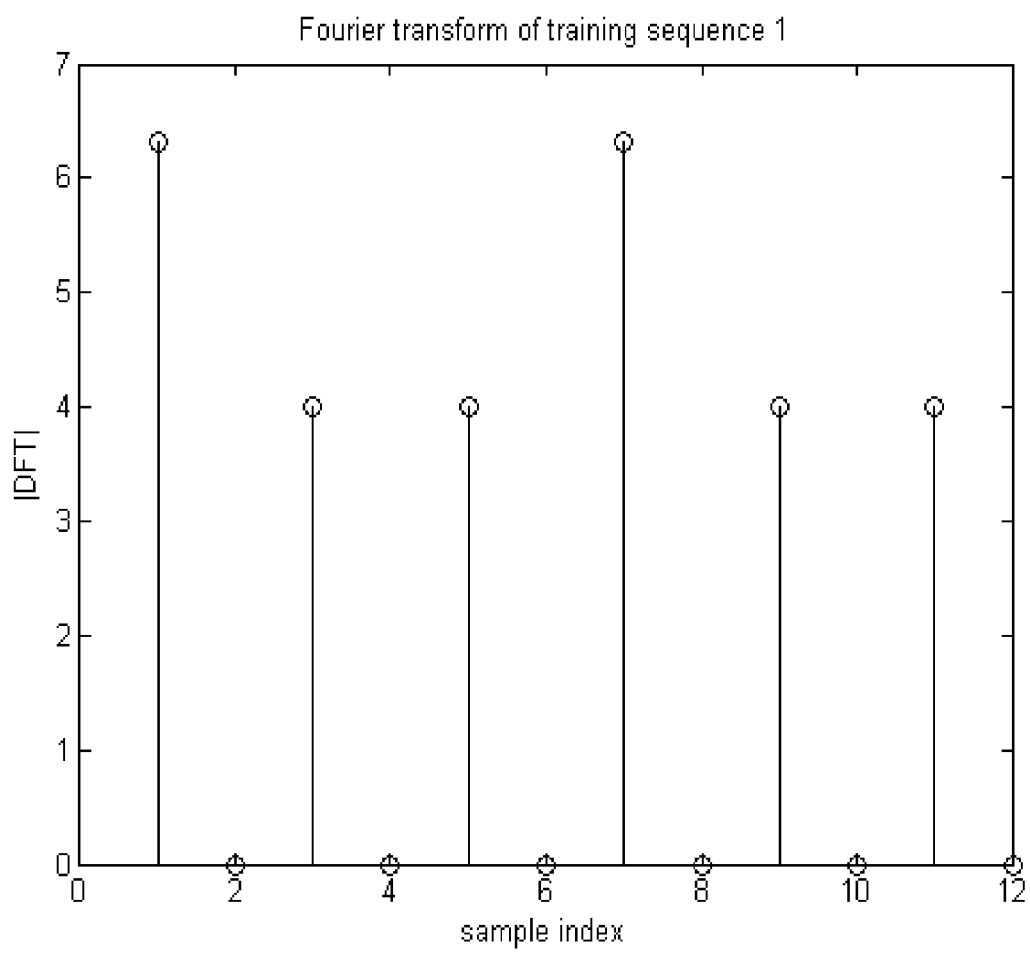
FIGS. 1 and 2 illustrate different DFT output.
Figure 2:
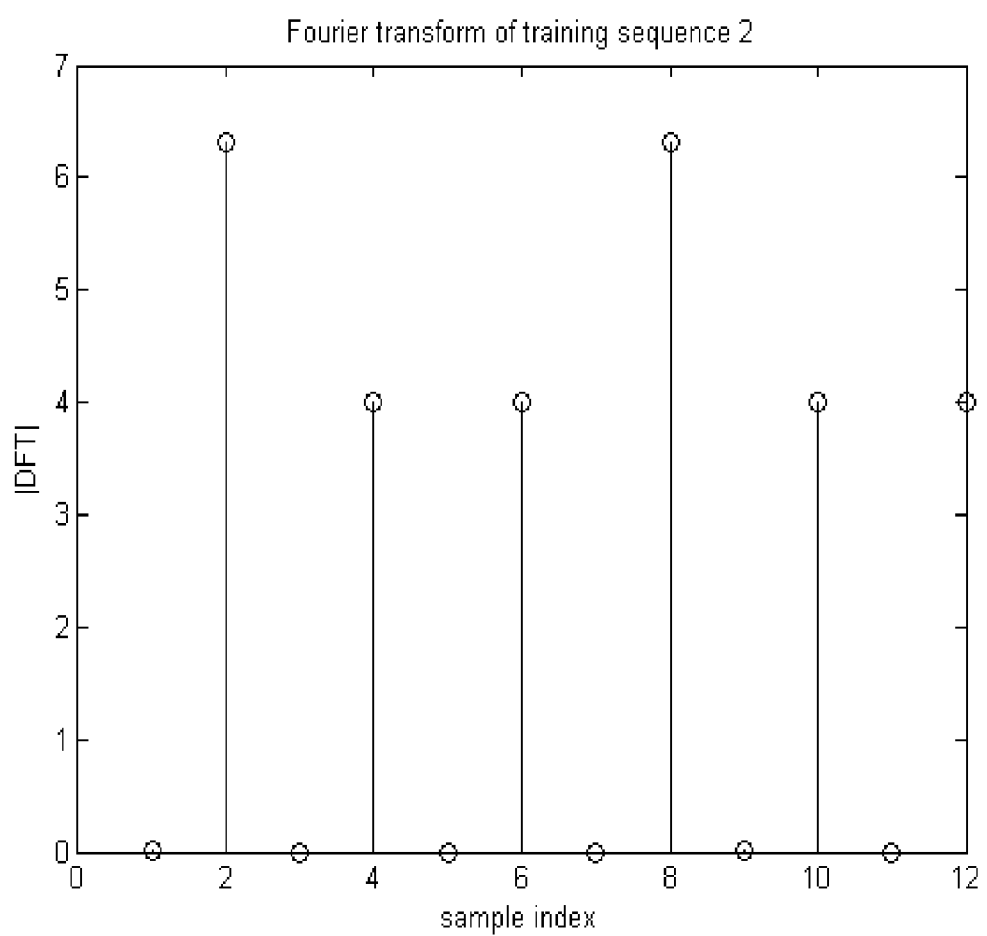

Note the following property of the training sequences. For any $0 \le k \le L_{pre}+L_{post}$ the sequences $[v_u(k), v_u(k+1), \ldots, v_u(k+2N_s)]$, $u=1, 2$, can be obtained from the sequences $t_{rep}^u$, $u=1, 2$ by a cyclic shift. This property was ensured by the addition of the cyclic prefix and postfix to the sequences $t_{rep}^u$, $u=1, 2$. A property of the Fourier transform is that a cyclic shift in the time domain is equivalent to a phase shift in the frequency domain. Moreover, building $t_{rep}^u$, $u=1, 2$ by block repetition forces the DFT of $t_{rep}^u$, $u=1, 2$ to be zero at the even/odd indices, as illustrated in FIG. 1 and FIG. 2. Therefore, for any $0 \le k \le L_{pre}+L_{post}$, 1. The sequence
   DFT$\{[v_1(k), v_1(k+1), \ldots, v_1(k+2N_s-1)]\}$ is zero for the even indices.
2. The sequence
   DFT$\{[v_2(k), v_2(k+1), \ldots, v_2(k+2N_s-1)]\}$ is zero for the odd indices.

Burst Formatting and Symbol Rotation

Let $\{s_1(n)\}_{k=0}^{N-1}$ and $\{s_2(n)\}_{k=0}^{N-1}$ denote the payload symbols for users one and two respectively, including guard and tail symbols, if any. For each user $u=1, 2$ the two training sequences are inserted in the middle of the burst, to form the formatted bursts $$\bar{s}_u = [s_u(0) \ldots s_u(N/2-1) v_u(1) \ldots v_u(N_t) s_u(N/2) \ldots s_u(N-1)], u=1,2.$$

More generally, the training sequence generated in accordance with the above is inserted as a midamble in the block of data symbols to be linearly modulated. Afterwards, the formatted bursts $\bar{s}_u$, $u=1, 2$ are rotated by a common angle $\phi$. This last step is optional.

Numerical Example

Assume that the equivalent discrete channel has 3 taps, the timing offset is less than or equal to one symbol time and the total number of training symbols is $N_t=15$. Then the following would be appropriate choices for the parameters: $N_s=6$, $L_{pre}=2$, $L_{post}=1$. The $N_s$ trainingsymbols may be chosen to be $t=[1\ j\ 1\ -j]$. The two training sequences are
'$v_1 = [1\ -j\ 1\ j\ 1\ j\ 1\ -j\ 1\ j\ 1\ j\ 1\ -j\ 1\ 1]$,
'$v_2 = [\alpha\ \beta\ 1\ -\alpha\ -\beta\ -1\ -\alpha\ -\beta\ -1\ \alpha\ \beta\ 1\ \alpha\ \beta\ 1]$,
with $$\alpha = \frac{1}{2} - j\frac{\sqrt{3}}{2} \text{ and } \beta = \frac{1}{2} - j\frac{\sqrt{3}}{2}.$$

Description of the Receiver

In the following the case of one receiver antenna is described. However, extensions to two or more antennas are straightforward. Let r(n) denote the received signal (after removing any modulation specific rotation). It can be modeled as $$r(n) = \sum_{k=0}^{L_1-1} h_1(k) s_1(n-k) + \sum_{k=0}^{L_2-1} h_2(k) s_2(n-k+m_2) + w(n)$$

for all n, where w(n) denotes the noise, $h_1(k)$ and $h_2(k)$ denote the channel to or from user 1 and user 2, respectively, depending on whether it is for uplink or downlink communication, $L_1$ and $L_2$ denote the number of taps in $h_1(k)$ and $h_2(k)$ respectively, $s_1$ and $s_2$ are the payload symbols for users one an two, and $m_2$ is the relative timing offset between the two users. Without loss of generality it is assumed that $0 \le m_2 \le L_{post}$ and $L_1=L_2=L$. Assume that $w(n) \sim N(0, \sigma_w^2)$, and that $h_1(k)$ and $h_2(k)$ remain unchanged over each burst. The received signal model applies to both uplink and downlink. It can however be the case that the methods described herein are more useful in the uplink. For downlink, $h_1(k)=h_2(k)$ when both signals are transmitted from the same antenna.

Over the training sequence the vector of received samples can be expressed in matrix form as.

$$R(n_0) \equiv \begin{bmatrix} r(n_0+L) \\ r(n_0+L+1) \\ \vdots \\ r(n_0+L+2N_s-1) \end{bmatrix} = H_1 \begin{bmatrix} v_1(L_{pre}-L+2) \\ \vdots \\ \vdots \\ v_1(L_{pre}+2N_s) \end{bmatrix} +$$

$$H_2 \begin{bmatrix} v_2(L_{pre}-L+2+m_2) \\ \vdots \\ \vdots \\ v_2(L_{pre}+2N_s+m_2) \end{bmatrix} + \begin{bmatrix} w(n_0+L) \\ w(n_0+L+1) \\ \vdots \\ w(n_0+L+2N_s-1) \end{bmatrix},$$

where $n_0$ denotes the synchronization position, and $H_u$, $u=1, 2$ are Toeplitz matrices of dimension $2N_s \times (2N_s+L-1)$ whose first column and row are the vectors
$[h_u(L-1)\ 0\ \ldots\ 0\ \ldots\ 0], [h_u(L-1)\ \ldots\ h_u(0)\ 0\ \ldots\ 0]$
respectively.

Since the training sequences are defined as periodic extensions of an initial block of training symbols (by adding cyclic prefixes and postfixes), the expression for the received samples can be re-written as follows.

$$R(n_0) = C_1 \begin{bmatrix} v_1(L_{pre}+1) \\ \vdots \\ \vdots \\ v_1(L_{pre}+2N_s) \end{bmatrix} +$$

$$C_2 \begin{bmatrix} v_2(L_{pre}+1+m_2) \\ \vdots \\ \vdots \\ v_2(L_{pre}+2N_s+m_2) \end{bmatrix} + \begin{bmatrix} w(n_0+L) \\ w(n_0+L+1) \\ \vdots \\ w(n_0+L+2N_s-1) \end{bmatrix},$$

where $C_u$, $u=1, 2$ are circulant matrices of dimension $2N_s \times 2N_s$, whose first column and row are the vectors
$[h_u(0)\ \ldots\ h_u(L-1)\ 0\ \ldots\ 0], [h_u(0)\ 0\ \ldots\ 0\ h_u(L-1)\ \ldots\ h_u(1)]$,
respectively.

Let F be the DFT matrix of size $2N_s \times 2N_s$. Then $$Z_{n_0} \equiv F \cdot R(n_0)$$

$$= F \cdot C_1 \begin{bmatrix} v_1(L_{pre}+1) \\ \vdots \\ \vdots \\ v_1(L_{pre}+2N_s) \end{bmatrix} + F \cdot C_2 \begin{bmatrix} v_2(L_{pre}+1+m_2) \\ \vdots \\ \vdots \\ v_2(L_{pre}+2N_s+m_2) \end{bmatrix} + F \cdot \begin{bmatrix} w(n_0+L) \\ w(n_0+L+1) \\ \vdots \\ w(n_0+L+2N_s-1) \end{bmatrix}$$

$$= \underbrace{F \cdot C_1 \cdot F^H}_{\Lambda_1} \cdot F \begin{bmatrix} v_1(L_{pre}+1) \\ \vdots \\ \vdots \\ v_1(L_{pre}+2N_s) \end{bmatrix} + \underbrace{F \cdot C_2 F^H}_{\Lambda_2} \cdot F \begin{bmatrix} v_2(L_{pre}+1+m_2) \\ \vdots \\ \vdots \\ v_2(L_{pre}+2N_s+m_2) \end{bmatrix} + F \cdot \begin{bmatrix} w(n_0+L) \\ w(n_0+L+1) \\ \vdots \\ w(n_0+L+2N_s-1) \end{bmatrix}$$

$$= \Lambda_1 \cdot F \begin{bmatrix} v_1(L_{pre}+1) \\ \vdots \\ \vdots \\ v_1(L_{pre}+2N_s) \end{bmatrix} + \Lambda_2 \cdot F \begin{bmatrix} v_2(L_{pre}+1+m_2) \\ \vdots \\ \vdots \\ v_2(L_{pre}+2N_s+m_2) \end{bmatrix} + F \cdot \begin{bmatrix} w(n_0+L) \\ w(n_0+L+1) \\ \vdots \\ w(n_0+L+2N_s-1) \end{bmatrix}.$$

The matrices $\Lambda_u$, u=1, 2 are diagonal since $C_u$, u=1, 2 are circulant. But now recall that as explained above the sequence $$V_1 = \mathrm{DFT}\{[v_1(L_{pre}+1), \ldots, v_1(L_{pre}+2N_s)]\}$$

is zero for the even indices, while $$V_2 = \mathrm{DFT}\{[v_2(L_{pre}+1+m_2), \ldots, v_2(L_{pre}+2N_s+m_2)]\}$$

is zero for the odd indices. Hence, defining $$W \equiv \mathrm{DFT}\{[w(n_0+L), \ldots, w(n_0+L+2N_s-1)]\}$$

It can be seen that $$Z_{n_0} = \Lambda_1 \begin{bmatrix} V_1(1) \\ 0 \\ V_1(3) \\ 0 \\ \vdots \\ V_1(2N_s-1) \\ 0 \end{bmatrix} + \Lambda_2 \begin{bmatrix} 0 \\ V_2(2) \\ 0 \\ V_2(4) \\ \vdots \\ 0 \\ V_2(2N_s) \end{bmatrix} + \begin{bmatrix} W(1) \\ W(2) \\ \vdots \\ W(2N_s) \end{bmatrix}.$$

To estimate the channel for the first user proceeds as follows. Firstly, pick the odd samples of $Z_{n_0}$.

$$Z_1 \equiv \begin{bmatrix} Z_{n_0}(1) \\ 0 \\ Z_{n_0}(3) \\ 0 \\ \vdots \\ Z_{n_0}(2N_s-1) \\ 0 \end{bmatrix} == \Lambda_1 \begin{bmatrix} V_1(1) \\ 0 \\ V_1(3) \\ 0 \\ \vdots \\ V_1(2N_s-1) \\ 0 \end{bmatrix} + \begin{bmatrix} W(1) \\ 0 \\ W(3) \\ 0 \\ \vdots \\ W(2N_s-1) \\ 0 \end{bmatrix}.$$

Note that this eliminates the part of the received signal corresponding to the second user, as well as half of the noise samples. Secondly, take the inverse Fourier transform.

$$\vec{z}_1 \equiv F^H Z_1 = F^H \Lambda_1 \begin{bmatrix} V_1(1) \\ 0 \\ V_1(3) \\ 0 \\ \vdots \\ V_1(2N_s-1) \\ 0 \end{bmatrix} + F^H \begin{bmatrix} W(1) \\ 0 \\ W(3) \\ 0 \\ \vdots \\ W(2N_s-1) \\ 0 \end{bmatrix}$$

$$= F^H F C_1 F^H \begin{bmatrix} V_1(1) \\ 0 \\ V_1(3) \\ 0 \\ \vdots \\ V_1(2N_s-1) \\ 0 \end{bmatrix} + F^H \begin{bmatrix} W(1) \\ 0 \\ W(3) \\ 0 \\ \vdots \\ W(2N_s-1) \\ 0 \end{bmatrix}.$$

But by definition $$\begin{bmatrix} V_1(1) \\ 0 \\ V_1(3) \\ 0 \\ \vdots \\ V_1(2N_s-1) \\ 0 \end{bmatrix} = F \cdot \begin{bmatrix} v_1(L_{pre}+1) \\ \vdots \\ \vdots \\ v_1(L_{pre}+2N_s) \end{bmatrix}.$$

Therefore $$\vec{z}_1 = F^H F C_1 F^H F \begin{bmatrix} v_1(L_{pre}+1) \\ \vdots \\ \vdots \\ v_1(L_{pre}+2N_s) \end{bmatrix} + F^H \cdot \begin{bmatrix} W(1) \\ 0 \\ W(3) \\ 0 \\ \vdots \\ W(2N_s-1) \\ 0 \end{bmatrix}.$$

Since $F^H F = I$, the result is the following equation.

$$\vec{z}_1 = F^H \begin{bmatrix} Z_{n_0}(1) \\ 0 \\ Z_{n_0}(3) \\ 0 \\ \vdots \\ Z_{n_0}(2N_s-1) \\ 0 \end{bmatrix} = C_1 \begin{bmatrix} v_1(L_{pre}+1) \\ \vdots \\ \vdots \\ v_1(L_{pre}+2N_s) \end{bmatrix} + F^H \cdot \begin{bmatrix} W(1) \\ 0 \\ W(3) \\ 0 \\ \vdots \\ W(2N_s-1) \\ 0 \end{bmatrix}.$$

Using Matlab-like notation, this equation may be written more succinctly as $$\vec{z}_1 = C_1 \cdot v_1(L_{pre}+1:L_{pre}+2N_s)^T + \text{IDFT}\{W(1:2:2N_s-1)\}^T.$$

From this equation it is straightforward to estimate $h_1(0), \ldots, h_1(L-1)$ since $C_1$ is a circulant matrix whose non-zero entries are exactly these channel coefficients. For example the equation can be easily re-cast as a least squares problem for the channel coefficients.

Observe that by applying the discrete Fourier transform, selecting the odd samples, then applying the inverse Fourier transform, the contribution of the second user is completely eliminated from the received signal, while at the same time the noise power has been reduced by 3 dB.

The procedure for user 2 is very similar, except that the even samples are chosen. That is, $$\vec{z}_2 = F^H \begin{bmatrix} 0 \\ Z_{n_0}(2) \\ 0 \\ Z_{n_0}(4) \\ \vdots \\ 0 \\ Z_{n_0}(2N_s) \end{bmatrix} = C_2 \begin{bmatrix} v_2(L_{pre}+1+m_2) \\ \vdots \\ \vdots \\ \vdots \\ v_2(L_{pre}+2N_s+m_2) \end{bmatrix} + F^H \begin{bmatrix} 0 \\ W(2) \\ 0 \\ W(4) \\ \vdots \\ 0 \\ W(2N_s) \end{bmatrix}.$$

Once again, the contribution of the first user to the received signal is completely eliminated, and the noise power is reduced by 3 dB. Finally note that since the Fourier transform and its inverse are unitary, the noise color is preserved.

Generalizations

The training sequences $v_u$, u=1, 2 were constructed in the time domain, starting with a small block of (possibly complex-valued) symbols and then repeating it. Repetition ensures that the sequences do not overlap in the frequency domain. This is a key orthogonality property. Note that there are other ways of achieving the same result. For example, let $[x(n)]_{n=1}^{2N_s}$ and $[y(n)]_{n=1}^{2N_s}$ be two complex valued sequences with the n=1 following properties.

1. Exactly $N_s$ entries in each sequence are zero.
2. If x(n)=0 for some index n then y(n)≠0 and vice versa.

Then the sequences $X=\text{IDFT}\{[x(1), x(2), \ldots, x(2N_s)]\}$ and $Y=\text{IDFT}\{[y(1), y(2), \ldots, y(2N_s)]\}$ have nonoverlapping spectra and the training sequences $v_u$, u=1, 2 may be constructed by adding cyclic prefix and cyclic postfix to X and Y. However, the generation of the training sequences in the time domain described above has advantages in terms of peak to average power ratio and simplicity.

Although the above describes a one antenna branch receiver, generalization to two or more antennas is straightforward. The case of only one antenna is the most challenging for multi-user detection.

Multiple Users

Transmitter

The generalization of the training sequence generation to more than two users is straightforward. Let's assume that there are $N_u$ users.

1. Select $N_s$ training symbols t(1), . . . , t($N_s$), with $N_u \cdot N_s < N_t$.
2. Form a block repeated sequence $t_{rep}=[t(1) \ldots t(N_s)] \otimes \vec{1}_{1 \times N_u}$. Here $\vec{1}_{M \times N}$ denotes a matrix of ones of dimension M×N.

3. For each user u=1, . . . , $N_u$ define rotation angles $$\omega_u = \frac{j2\pi \cdot (u-1)}{N_u N_s}.$$

Form the rotated repeated sequences $t_{rep}^u(n)=t_{rep}(n)\cdot\exp(j(n-1)\omega_u)$, $1 \leq n \leq N_u \cdot N_s$.

4. For each user u=1, . . . , $N_u$ extend the rotated repeated sequences periodically, by adding a cyclic prefix and a cyclic postfix. Choose two integers $L_{pre}$ and $L_{post}$ such that $L_{pre}+L_{post}+N_u N_s=N_t$. As before, $L_{pre}$ is the length of a cyclic prefix and $L_{post}$ is the length of a cyclic postfix. If L denotes the discrete channel length then $L_{pre} \geq L-1$. Moreover, should be chosen to be at least as large as the expected time offset between the signals. The periodically extended sequences are $$v_u = \left[\underbrace{t_{rep}^u(N_u \cdot N_s - L_{pre}+1) \ldots t_{rep}^u(N_u \cdot N_s)}_{prefix} \right.$$
$$\left. t_{rep}^u(1) \ldots t_{rep}^u(N_u \cdot N_s) \underbrace{t_{rep}^u(1) \ldots t_{rep}^u(L_{post})}_{postfix}\right],$$

u=1, . . . , $N_u$.

Figure 4:
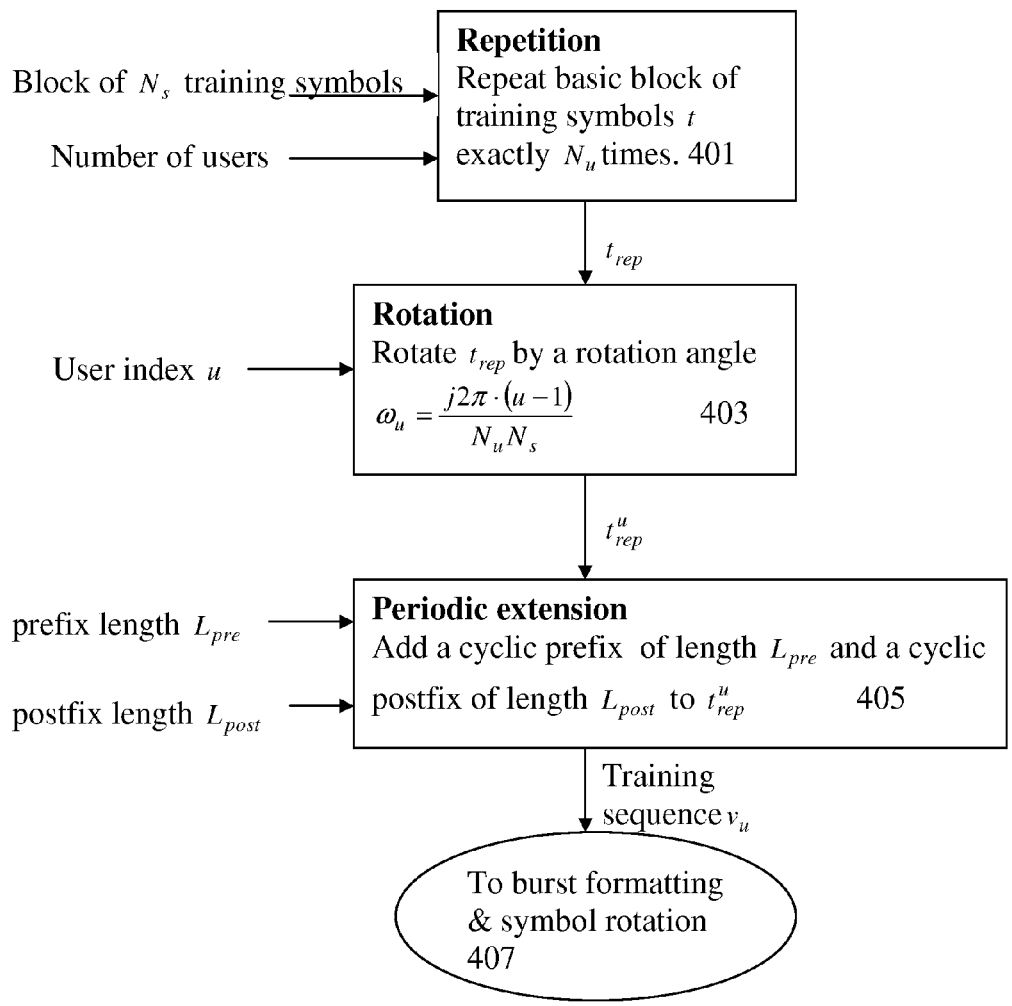
FIG. 4 is a view illustrating modules used for generating training sequences in a transmitter.

This procedure as implemented in a number of modules is illustrated in FIG. 4. In FIG. 4, a view illustrating some modules that for example can be used to perform the steps illustrated in FIG. 3. The modules depicted in FIG. 4 can be implemented in a transmitter in some suitable manner such as by software executed by a microprocessor. First in a predetermined block of symbols is given as input to a module 401. In the module 401, the initial block is repeated as many times as there are users. The resulting sequence is fed to a rotation module 403. Each user will apply a rotation by an angle that is specific to each user. The resulting rotated sequence is fed to a periodic extension module 405, where cyclic prefix and postfix are added. Here each user will have generated its training sequence as is indicated by reference numeral 407. This training sequence is passed on to a linear modulator. Then the burst is formatted. This means adding data symbols, tail symbols and guard symbols. An additional rotation can in accordance with one embodiment also be applied to the whole formatted burst. This rotation is optional. The formatted burst will then modulate a train of Dirac delta pulses that will excite a linear filter.

Receiver

The receiver side processing is also very similar to that described above for two users. Let $m_u=1, \ldots, N_u$ denote the time offsets and let $n_0$ be the synchronization position and $$R(n_0) \equiv \begin{bmatrix} r(n_0+L) \\ r(n_0+L+1) \\ \vdots \\ r(n_0+L+N_u N_s-1) \end{bmatrix}$$

be the vector of received samples over the training sequences. Compute the discrete Fourier transform $Z_{n_0}=F \cdot R(n_0)$. In order to obtain the channel estimate for user u, zero all the entries of $Z_{n_0}$ except those with indices $u, u+N_u, u+2N_u, \ldots, u+(N_{s-1})N_u$.

$$Z_{n_0}^u = [0 \ldots 0 Z_{n_0}(u) 0 \ldots 0 Z_{n_0}(u+N_u) 0 \ldots 0 Z_{n_0}(u+2N_u) 0 \ldots]^T,$$

Now apply the inverse discrete Fourier transform to obtain $$\vec{z}_u = F^H \cdot Z_{n_0}{}^u = C_u \cdot v_u (L_{pre}+1+m_u : L_{pre}+2N_s+m_u)^T +$$
$$\text{IDFT}\{[0 \ldots 0 W(u) 0 \ldots 0 W(u+N_u) 0 \ldots 0 W(u+2N_u) 0 \ldots]\}^T$$

Just as before, $C_u$ is a circulant matrix whose non-zero entries are exactly the channel coefficients $h_u(0), \ldots, h_u(L-1)$, the noise power has been reduced by $10 \log_{10}(N_u)$ dB, the color of the noise is preserved, and the contribution to the received signal of all users except user u has been eliminated. This provides a single user linear model from which $h_u(0), \ldots, h_u(L-1)$ can be estimated using any algorithm chosen among the plethora of linear estimation algorithms, such as least squares or LLMSE.

Figure 5:
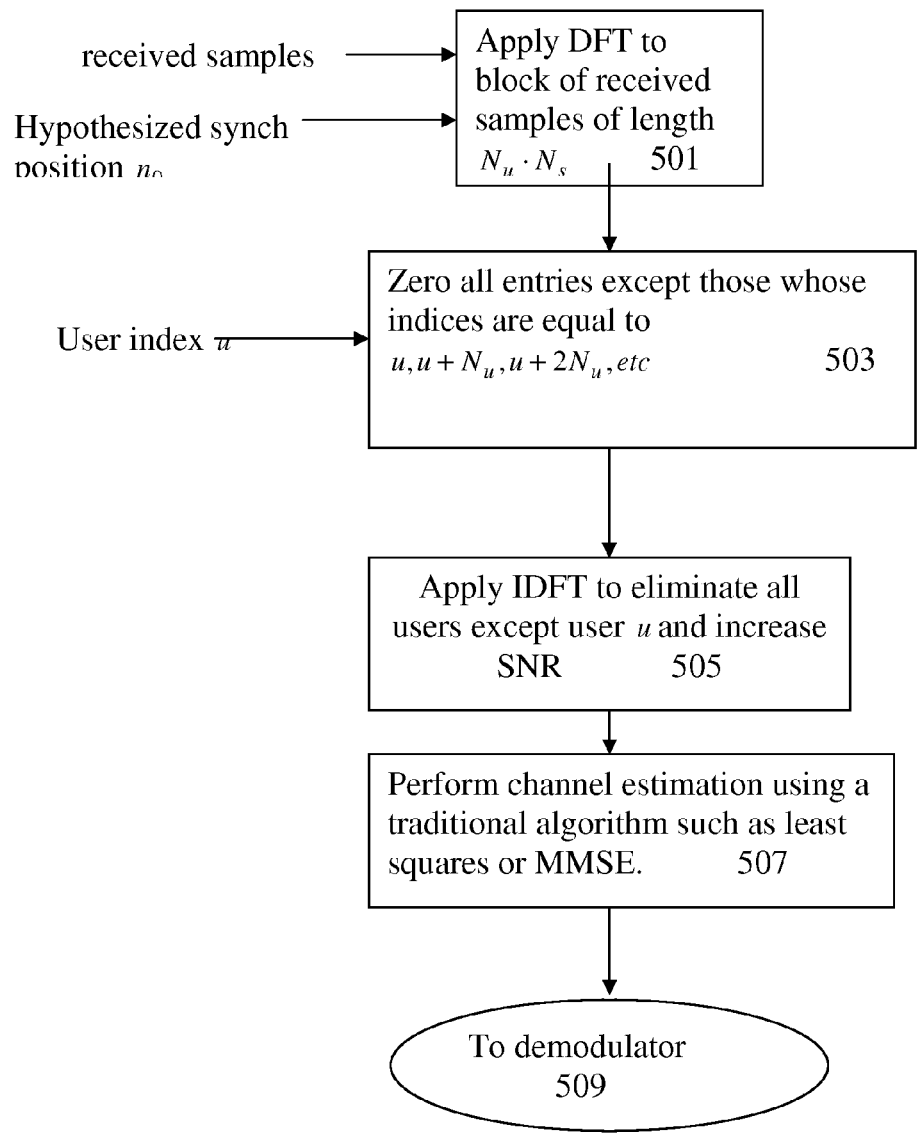
FIG. 5 is a view illustrating modules used for receiving signals in a receiver.

FIG. 5 illustrates processing modules that can be used in a receiver to implement an estimation method at the receiver side in order to estimate the channel for any given user. The modules depicted in FIG. 5 can be implemented in a transmitter in some suitable manner such as by software executed by a micro processor. The processing may be applied to each user independently. That is, even though the received signal consists of the superposition of several users' signals, it is possible to only estimate one channel at a time. This is in contrast to the joint channel estimation that is much more complex. In FIG. 5 receiver processing of channel estimation for user u, $1 \leq u \leq N_u$ is shown.

First in a module 501, a Discrete Fourier Transform (DFT) is applied to a block of received samples that correspond to the training symbols. This creates a frequency domain signal. Then in a module 503, selected entries of the frequency domain signal are zeroed. (To zero an entry means to multiply it by zero.) The entries that are zeroed are in accordance with some embodiments user specific entries of the frequency domain signal.

Then, in a module 505, the zeroed frequency domain signal is transferred back to time domain by means of an IDFT (inverse DFT). This time domain signal has the same length as the original signal fed to the module 501, but now contains only energy from one of the users. The specific user was chosen in the module 503 by the user specific zeroing. All other users have been cancelled.

A module 507 is fed a single user signal modulated in the time domain. This signal consists of a known training sequence modulated in the time domain and filtered through a radio channel. There are a plethora of algorithms available to compute a channel estimate for these types of signals, such as Least Squares, correlator, or Minimum Mean Square Error channel estimators. For example any EDGE receiver implements such channel estimation algorithms and these algorithms may be re-used in this case.

Finally, the channel estimates are fed to a demodulator as is indicated in box 509.

It is to be noted that the processing can be performed for each hypothesized synchronization position. The synchronization position that yields the best channel estimate is typically chosen. Any suitable existing method for choosing the best channel estimate can be used.

Also, if an additional rotation is applied in the transmitter (this is an optional step described above in conjunction with FIG. 4) then a de-rotation can be applied to the received samples prior to feeding the received samples to module 501 in FIG. 5.

Blind Detection

In EGPRS/EGPRS2 the modulation type is unknown at the receiver. However, it is implicitly signaled by applying different rotations to the training symbols. Each modulation (e.g. 8PSK, 16QAM) has its own, unique rotation angle. The process of discovering the modulation type of the signal is known as blind detection.

The blind detection of EGPRS/EGPRS2 can also be configured to include signals whose training sequence has been created using the block repetition technique described herein. This is useful because it allows users to adaptively switch between single layer EGPRS/EGPRS2 and MIMO/MU-MIMO modes depending on the radio channel conditions or the signaling needs.

The training sequences described herein have the following property that is not shared by the EGPRS/EGPRS2 training sequences.

The new training sequences are periodic with period $N_s$.

This property is enough to blindly detect the modulation type at the receiver. A procedure exemplifying the above is depicted in FIG. 6.

Systems like GSM/EDGE allow the transmitter to choose the modulation. For example in EGPRS-2 the receiver does not know if the received signal was GMSK/8PSK or 16QAM modulated. The transmission methods described herein are well suited to a system such as GSM/EDGE enhanced for use in MIMO or MU-MIMO modes. For example, the transmitter may be given the possibility to choose between single layer transmission and multiple layer transmission such as MIMO. The receiver may not know a-priori whether the received signal consists of one layer or several layers. If the transmitter uses an algorithm as described in conjunction with FIGS. 3 and 4 in order to generate the training sequence, then the receiver may detect blindly whether the signal consists of one or several layers. The periodic structure of the training sequences described herein is not shared by the EGPRS/EGPRS2 training sequences.

Figure 6:
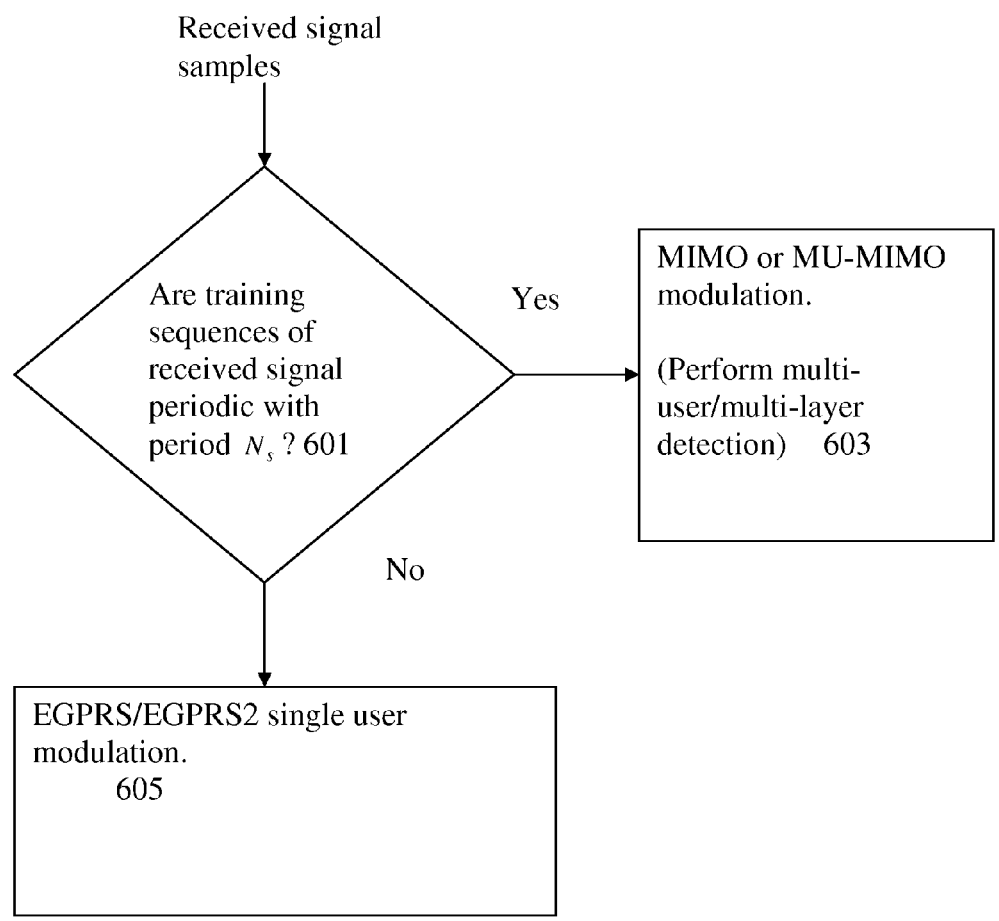
FIG. 6 is a flow chart illustrating some steps performed in blind detection of a received signal.

Thus in FIG. 6, received samples are fed to a first processing step 601. In it, it is determined whether the signal consists of two or more layers, each having a training sequence generated according to a method described in conjunction with FIG. 3 or 4. This can be accomplished for example by repeated application of an algorithm as described in conjunction with FIG. 5. The algorithm can typically be applied as many times as the hypothesized number of layers. If the training sequences are not periodic, then the best channel estimates are highly unreliable. Any suitable existing method to determine if a channel estimate is unreliable can be applied. Thus, in step 601 it can be determined if the training sequences are periodic.

Depending on the decision made in step 601, the signal is fed to a MIMO/MU-MIMO demodulator in a step 603. This is the case if the training sequences of the received signal are periodic. In case the training sequences of the received signal are not periodic the signal is fed to a single user demodulator in a step 605. Demodulation of single user/MIMO/MU-MIMO signals is then performed using some suitable method.

Figure 7:
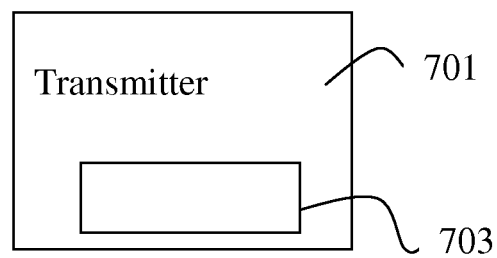
FIG. 7 is a general view of a transmitter.

FIG. 7 depicts a transmitter 701 for generating and transmitting signals as described herein. The transmitter 701 comprises controller circuitry 703 for performing the various steps required when forming a signal for transmission in accordance with the principles described herein. In particular the controller circuitry can be adapted to form a sequence of training symbols by repeating an initial block of training symbols, for each user rotate the repeated block by a user specific rotation angle, and to periodically extend each rotated block in both ends. The controller circuitry can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

Figure 8:
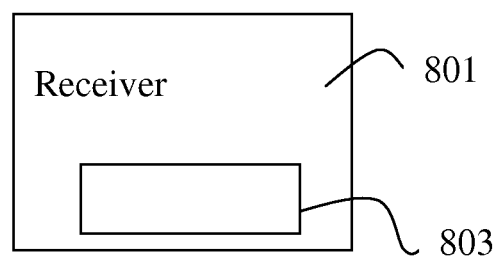
FIG. 8 is a general view of a receiver.

FIG. 8 depicts a receiver 801 for receiving and processing received signals as described herein. The receiver 801 comprises controller circuitry 803 for performing the various steps required when receiving signals in accordance with the principles described herein. In particular the controller circuitry can be adapted to apply a Discrete Fourier Transform, DFT, to a block of received samples that correspond to training symbols of the received signal to generate a frequency domain signal, and multiply selected entries of the frequency domain signal by zero. The controller circuitry can further be adapted to apply an Inverse DFT to transform the zeroed frequency domain signal to a time domain signal, and to process the time domain signal. The controller circuitry can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

Using the transmission methods as described herein provides several advantages over existing multi-user multiplexing methods such as VAMOS. Such advantages can typically include but are not limited to:

Perfect orthogonality between the users can be obtained (for quasi-stationary channels).

Accurate channel estimation and synchronization for multiple users can be achieved even with a single antenna receiver.

The transmitter and receiver complexity required are very low. This makes the proposed transmitter and receiver easy to implement in legacy GSM/EDGE Mobile Station (MS) and Base Transceiver Station (BTS) hardware.

The transmission and reception methods are very well suited for low-complexity Multiple Input Multiple Output (MIMO) or Multi-User MIMO (MU-MIMO) in wireless systems that rely on time-domain modulation, such as GSM/EDGE.

Blind detection of modulation can be easily incorporated to the transmission and reception methods. This makes it easy to enhance EGPRS/EGPRS2 to include MIMO and MU-MIMO.

Finally it is to be noted that other implementations than those specifically set forth herein can of course be formed without departing from essential characteristics of the described methods and devices. The present embodiments are to be considered in all respects as illustrative and not restrictive. In particular the teachings herein are applicable for a mobile station (or radio base station) in a single user Multiple Input Multiple Output (MIMO) mode. In a single user MIMO mode there is just one mobile station transmitting in the transmission slot, but there are several layers transmitted in each transmission slot. Each layer is a data stream sent through a different transmit antenna. The methods and devices as described herein can thus be applied to two (or more) mobile stations, each having one transmit antenna, and it can equally well be applied to one mobile station having two (or more) transmit antennas, when the one mobile station is transmitting in single user MIMO mode. In both these scenarios there will be two different data streams, two training sequences and two antennas (in the case of two users in the same transmission slot).

More generally it is possible to have one mobile station with 4 transmit antennas, 2 mobile stations each with 2 transmit antennas, 4 mobile stations each with one transmit antenna, and so on. The generation of 4 training sequences is identical in all cases: In the case of 4 transmitting antennas there are 4 orthogonal training sequences.

In accordance with yet one exemplary implementation one layer or data stream can be sent via multiple transmit antennas. In such an implementation the number of training sequences corresponds to the total number of layers or data streams transmitted in the same transmission slot. For example, two layers or data streams and two orthogonal training sequences can be sent through 4 transmit antennas, but sending exactly the same data stream through two Tx antennas.

The invention claimed is:

1. A method of generating user-specific training symbols for transmission in a radio network, where the user is one among multiple users sharing a same transmission slot, said method comprising:
   forming a sequence of training symbols by repeating an initial block of training symbols;
   obtaining a rotated sequence of training symbols by rotating the sequence of training symbols by a rotation angle that is specific to the user with respect to the multiple users sharing the same transmission slot; and
   periodically extending both ends of the rotated sequence of training symbols, to thereby obtain a training sequence for transmission that is specific to the user with respect to the multiple users sharing the same transmission slot, wherein periodically extending both ends of the rotated sequences of training symbols comprises adding a cyclic prefix to one of the ends and adding a cyclic post-fix to the other one of the ends.

2. The method according to claim 1, wherein the rotation angle is selected to provide orthogonality between the training sequence obtained for the user and other training sequences obtained in like manner for other ones of the multiple users.

3. The method according to claim 1, wherein the initial block of training symbols is chosen from a complex constellation of fixed length.

4. The method according to claim 3, wherein the complex constellation is one of: Binary Phase Shift Keying (BPSK), Quadrature Phase Shift Keying (QPSK), 8-Phase Shift Keying (8PSK), and Quadrature Amplitude Modulation (QAM).

5. The method according to claim 1, wherein the initial block of training symbols is specific to the user with respect to the multiple users sharing the same transmission slot.

6. The method according to any of claim 1, wherein the initial block is repeated as many times as there are users sharing the same transmission slot.

7. The method according to claim 1, wherein the multiple users are multiple layers transmitted from one mobile station or radio base station in a single user Multiple Input Multiple Output (MIMO) mode.

8. A device for generating a training sequence to be transmitted in a radio network for a user that is among multiple users sharing the same transmission slot, the device comprising controller circuitry that is adapted to:
   form a sequence of training symbols by repeating an initial block of training symbols;

obtain a rotated sequence of training symbols by rotating the sequence of training symbols by a rotation angle that is specific to the user with respect to the multiple users sharing the same transmission slot; and periodically extend both ends of the rotated sequence of training symbols, to thereby obtain a training sequence for transmission that is specific to the user with respect to the multiple users sharing the same transmission slot, wherein the controller circuitry is adapted to periodically extend both ends of the rotated sequence by adding a cyclic prefix to one of the ends and adding a cyclic post-fix to the other one of the ends.

9. The device according to claim 8, wherein the rotation angle is selected to provide orthogonality between the training sequence obtained for the user and other training sequences obtained in like manner for other ones of the users.

10. The device according to claim 8, wherein the initial block of training symbols is selected from a complex constellation of fixed length.

11. The device according to claim 10, wherein the complex constellation is one of: Binary Phase Shift Keying (BPSK), Quadrature Phase Shift Keying (QPSK), 8-Phase Shift Keying (8PSK), and Quadrature Amplitude Modulation (QAM).

12. The device according to claim 8, wherein the initial block of training symbols is user specific.

13. The device according to claim 8, wherein the controller circuitry is adapted to repeat the initial block as many times as there are users.

14. The device according to claim 8, wherein the multiple users are multiple layers transmitted from one mobile station or radio base station in a single user Multiple Input Multiple Output (MIMO) mode.

* * * * *